US 7,908,472 B2

(12) United States Patent
Freed et al.

(10) Patent No.: US 7,908,472 B2
(45) Date of Patent: Mar. 15, 2011

(54) SECURE SOCKETS LAYER CUT THROUGH ARCHITECTURE

(75) Inventors: Michael Freed, Pleasanton, CA (US); Elango Gannesan, Palo Alto, CA (US); Praveen Patnala, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 3360 days.

(21) Appl. No.: 09/900,515

(22) Filed: Jul. 6, 2001

(65) Prior Publication Data
US 2003/0014623 A1    Jan. 16, 2003

(51) Int. Cl.
H04L 29/06    (2006.01)
H04L 9/32    (2006.01)
H04L 9/28    (2006.01)
G06F 12/14    (2006.01)
G06F 7/04    (2006.01)
G06F 17/00    (2006.01)
G06F 15/16    (2006.01)
G06F 15/173    (2006.01)
H04K 1/00    (2006.01)

(52) U.S. Cl. ........ 713/150; 713/153; 713/168; 713/169; 713/189; 726/3; 726/12; 726/15; 380/255; 380/28; 709/203; 709/219; 709/224; 709/239

(58) Field of Classification Search .................. 713/150, 713/152, 168, 200, 201, 153, 169, 189; 726/3, 726/12, 15; 380/255, 28; 709/203, 219, 709/224, 239
See application file for complete search history.

(56) References Cited

U.S. PATENT DOCUMENTS

| 5,293,424 | A | * | 3/1994 | Holtey et al. .................. 713/193 |
| 5,613,136 | A | | 3/1997 | Casavant et al. |
| 5,721,855 | A | | 2/1998 | Hinton et al. |
| 5,825,890 | A | | 10/1998 | Elgamal et al. |
| 5,841,873 | A | | 11/1998 | Lockhart et al. |
| 5,978,918 | A | | 11/1999 | Scholnick et al. |
| 6,009,502 | A | * | 12/1999 | Boeuf ........................... 711/170 |
| 6,052,728 | A | * | 4/2000 | Fujiyama et al. ............. 709/224 |
| 6,052,785 | A | | 4/2000 | Lin et al. |
| 6,094,485 | A | * | 7/2000 | Weinstein et al. .............. 380/30 |
| 6,101,543 | A | | 8/2000 | Alden et al. |
| 6,157,955 | A | | 12/2000 | Narad et al. |

(Continued)

OTHER PUBLICATIONS

Freier, Karlton, Kocher, The SSL Protocol Version 3.0, Netscape Communications, Transport Layer Security Working Group, Nov. 18, 1996, http://wp.netscape.com/eng/ss13/draft302.txt.
Harmon, William "32-Bit Bus Master Ethernet Interface for the 68030 (Using the Macintosh SE/30)," Apr. 1993.

(Continued)

Primary Examiner — Aravind K Moorthy
(74) Attorney, Agent, or Firm — Shumaker & Sieffert, P.A.

(57) ABSTRACT

An acceleration apparatus is adapted to operate in a direct mode and a proxy mode. In the direct mode, the acceleration apparatus decrypts data packets received from a client and forwards the decrypted data packets to a server using a communication session negotiated by the client and the server. In the proxy mode, the acceleration apparatus responds to the client on behalf of the server and forwards the decrypted data packets to the server using a communication session negotiated by the acceleration device and the server. The acceleration apparatus automatically switches from the direct mode to the proxy mode upon detection of a communication error associated with the communication session negotiated by the client and the server.

50 Claims, 7 Drawing Sheets

U.S. PATENT DOCUMENTS

| | | | | |
|---|---|---|---|---|
| 6,223,260 | B1 | 4/2001 | Gujral et al. | |
| 6,240,513 | B1 | 5/2001 | Friedman et al. | |
| 6,253,337 | B1 * | 6/2001 | Maloney et al. | 714/38 |
| 6,373,857 | B1 | 4/2002 | Ma | |
| 6,374,329 | B1 | 4/2002 | McKinney et al. | |
| 6,377,990 | B1 | 4/2002 | Slemmer et al. | |
| 6,389,462 | B1 * | 5/2002 | Cohen et al. | 709/218 |
| 6,397,259 | B1 | 5/2002 | Lincke et al. | |
| 6,400,724 | B1 | 6/2002 | Yao | |
| 6,405,289 | B1 | 6/2002 | Arimilli et al. | |
| 6,415,329 | B1 * | 7/2002 | Gelman et al. | 709/245 |
| 6,434,687 | B1 | 8/2002 | Huppenthal | |
| 6,442,687 | B1 * | 8/2002 | Savage | 713/156 |
| 6,449,658 | B1 | 9/2002 | Lafe et al. | |
| 6,470,027 | B1 | 10/2002 | Birrell, Jr. | |
| 6,473,425 | B1 * | 10/2002 | Bellaton et al. | 370/392 |
| 6,484,257 | B1 * | 11/2002 | Ellis | 713/153 |
| 6,490,251 | B2 | 12/2002 | Yin et al. | |
| 6,539,494 | B1 | 3/2003 | Abramson et al. | |
| 6,578,074 | B1 | 6/2003 | Bahlmann | |
| 6,584,567 | B1 * | 6/2003 | Bellwood et al. | 713/171 |
| 6,598,167 | B2 | 7/2003 | Devine et al. | |
| 6,606,708 | B1 | 8/2003 | Devine et al. | |
| 6,654,344 | B1 | 11/2003 | Toporek et al. | |
| 6,681,327 | B1 * | 1/2004 | Jardin | 713/153 |
| 6,732,175 | B1 | 5/2004 | Abjanic | |
| 6,732,269 | B1 | 5/2004 | Baskey et al. | |
| 6,785,719 | B1 | 8/2004 | Jacobson et al. | |
| 6,799,202 | B1 | 9/2004 | Hankinson et al. | |
| 6,820,215 | B2 * | 11/2004 | Harper et al. | 714/15 |
| 6,952,768 | B2 | 10/2005 | Wray | |
| 6,993,651 | B2 | 1/2006 | Wray et al. | |
| 2001/0042190 | A1 | 11/2001 | Tremblay et al. | |
| 2002/0007443 | A1 | 1/2002 | Gharachorloo et al. | |

OTHER PUBLICATIONS

Troutman, Denise "DP83916EB-AT: High Performance AT Compatible Bus Master Ethernet Adapter Card," Nov. 1992.

"Integrated SSL Processing and Intelligent Traffic Management" F5 Networks, Inc. http://www.f5.com/f5products/bigip/sslaccelerator/index.html.

"SSL Accelerator Frequently Asked Questions" F5 Networks, Inc. http://www.f5.com/f5products/bigip/sslaccelerator/sslacceleratorfaq.html.

"Why Do We Need Cryptographic Accelerators?" Accelerated Encryption Processing, http://www.aep.ie/technical/ITC7/html, 1999.

"SSL Primer" CacheFlow Technical Note, CacheFlow Inc., Oct. 2000.

"SSL 3.0 Specification" http://home.netscape.com/eng/ssl3/3-SPEC.HTM.

Kegel, Dan "SSL Acceleration" http://www.kegel.com/ssl/hw.html, Mar. 28, 2001.

MacVittie, Lori "E-Commerce Security Gets a Boost" http://www.networkcomputing.com/shared/printArticle?article=nc/1105/1105f3full.html&pub, Mar. 20, 2000.

MacVittie, Lori "Web Server Director Comes Out on Top of the Pile" http://www.networkcomputing.com/shared/printArticle?article=nc/1203/1203f1bfull.html&pub, Feb. 5, 2001.

MacVittie, Lori "Cryptographic Accelerators Provide Quick Encryption" http://networkcomputing.com/shared/printArticle?article=nc/1008/1008r1full.html&pub, Apr. 19, 1999.

Douglas E. Comer, "Internetworking with TCP/IP: Principles, Protocols, and Architectures," 2000, Prentice Hall, 4th Edition, pp. 101-106.

* cited by examiner

Figure 1
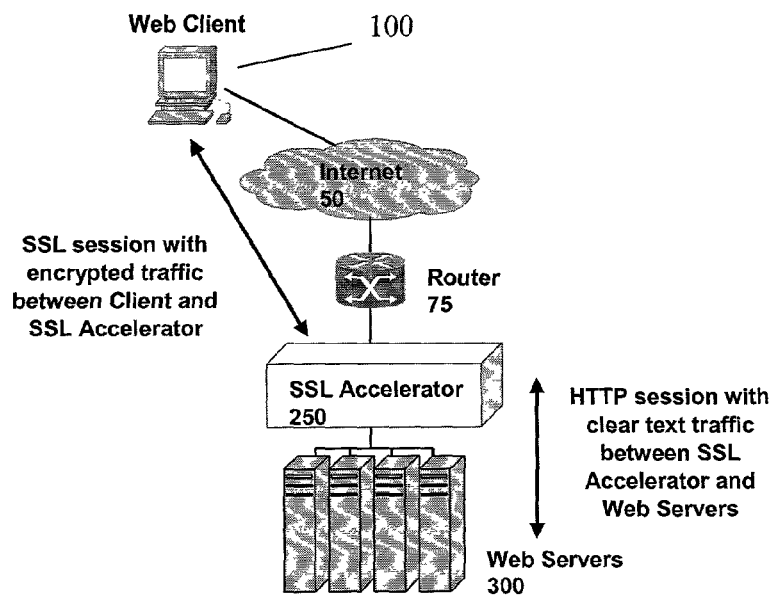
Figure 2A
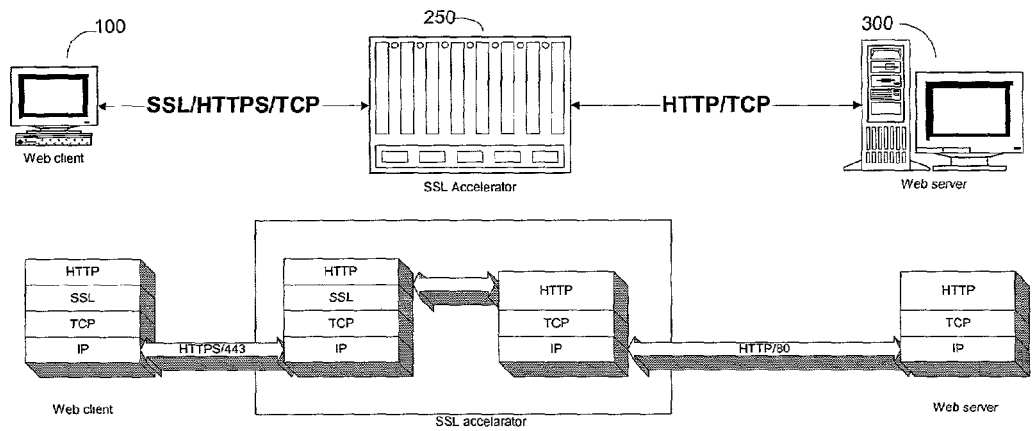
Figure 2B

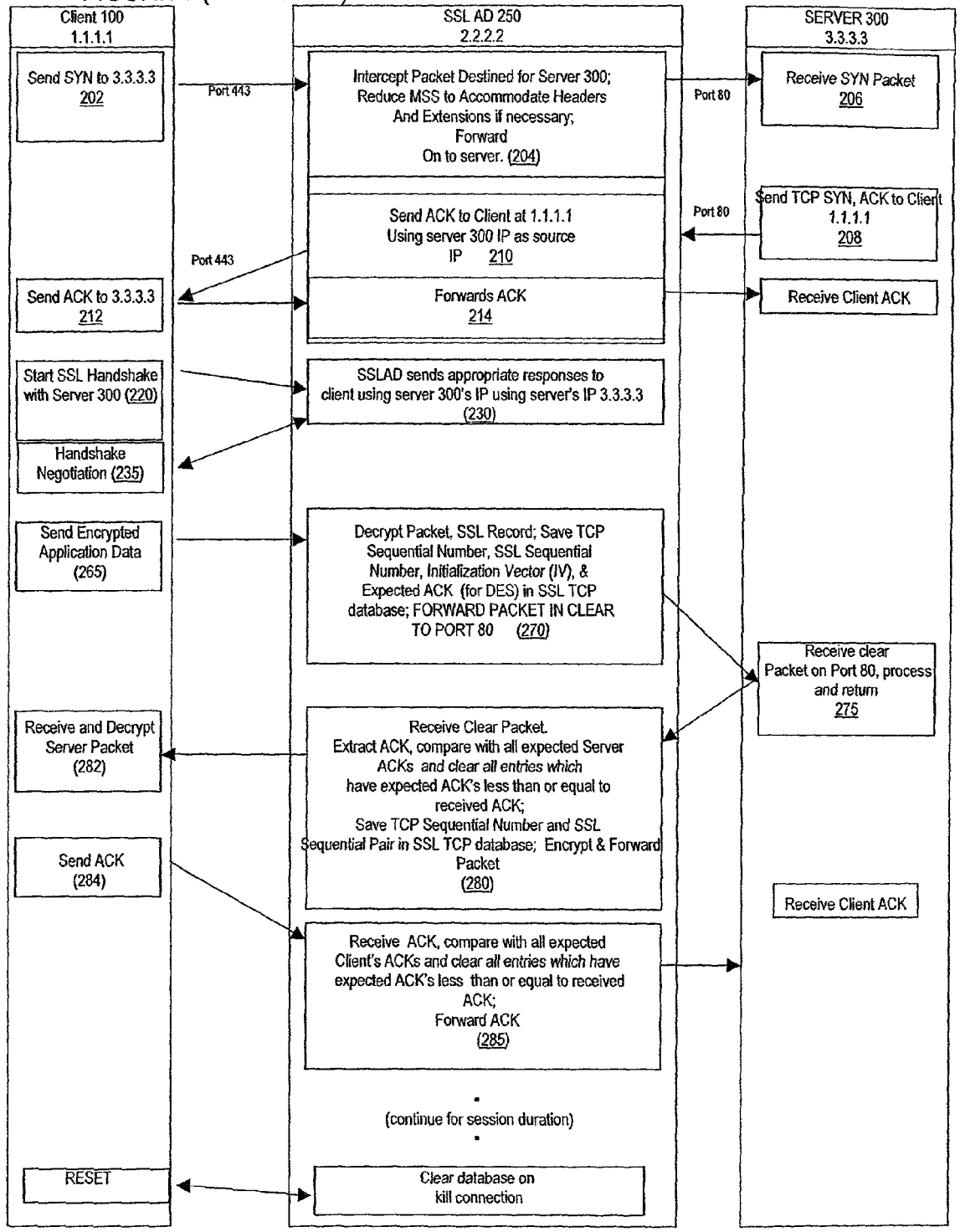

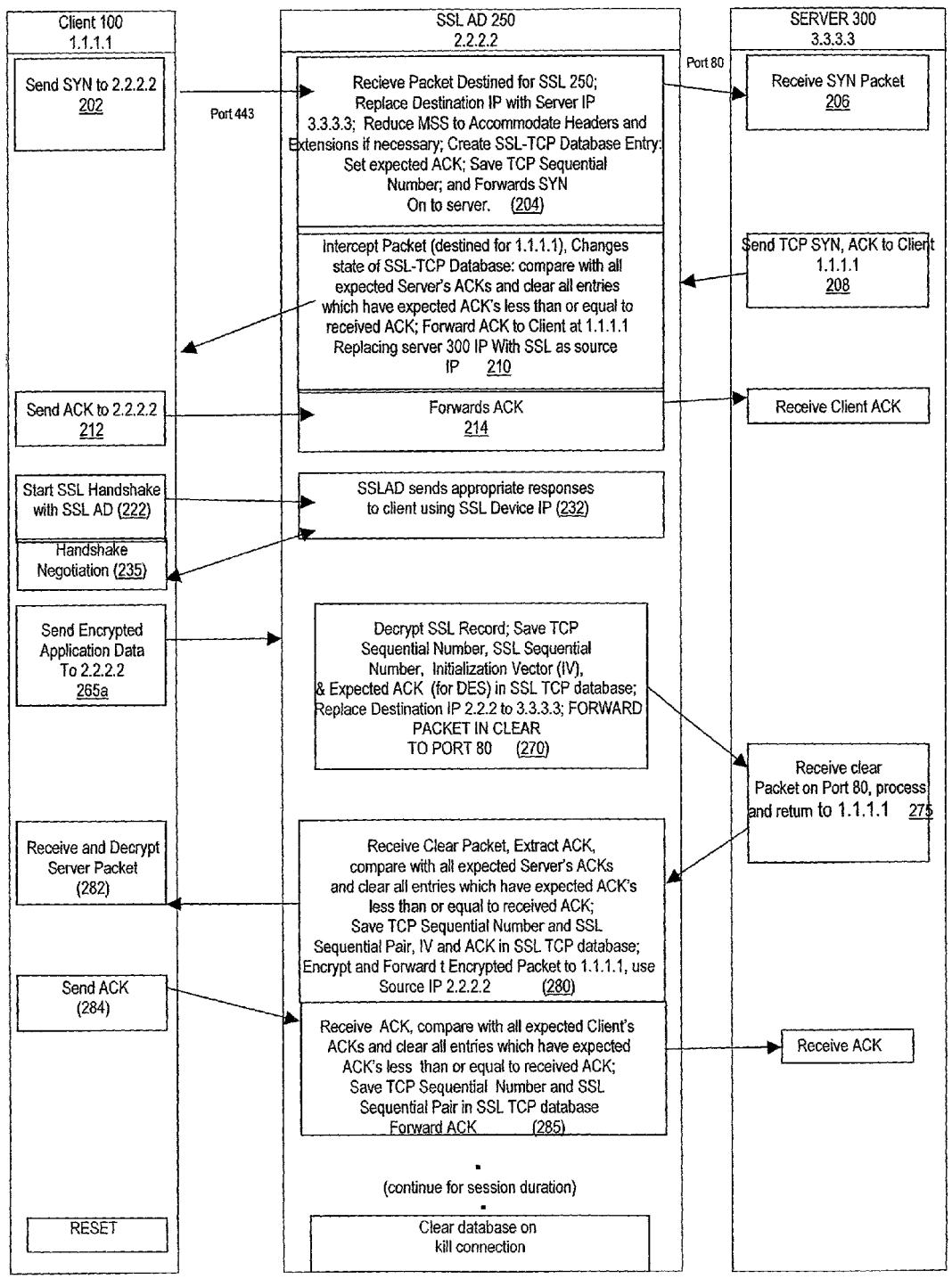
FIGURE 6 (Load Balance Mode)

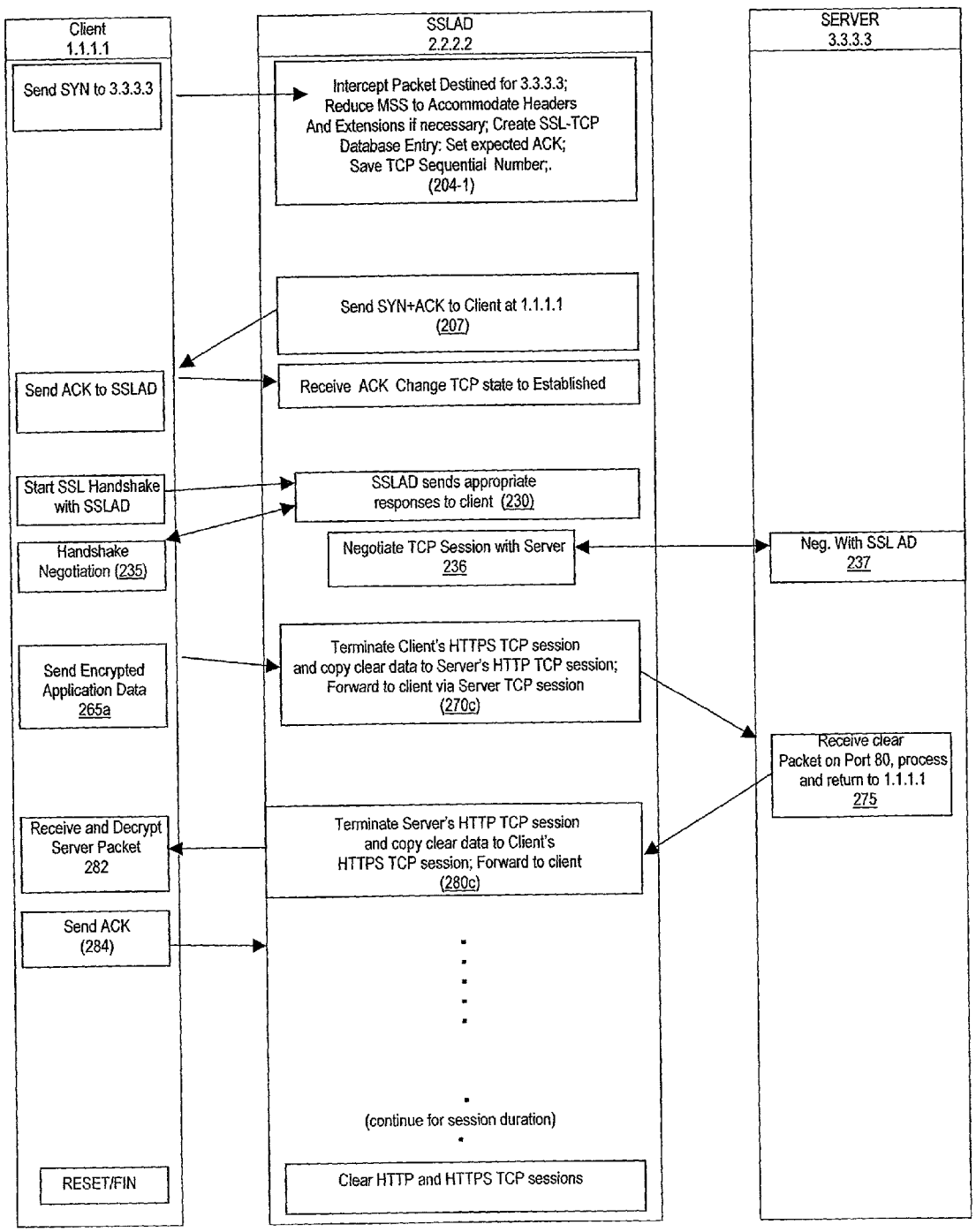

Figure 8
Normal SSL Record

| IP/TCP Header | SSL Header | DATA | HMAC MD5 SHA, etc. | Pad/Pad Length |
|---|---|---|---|---|

Multi-Segment:

| IP/TCP Header | SSL Header | Data |
|---|---|---|

| IP/TCP Header | DATA | | HMAC MD5 SHA, etc. | Pad/Pad Length |
|---|---|---|---|---|

SECURE SOCKETS LAYER CUT THROUGH ARCHITECTURE

BACKGROUND OF THE INVENTION

1. Field of the Invention

The invention relates to improving the performance of secure communications between network-coupled devices, such as computers. In particular, to improving performance of secure communications using the Secure Sockets Layer (SSL) protocol between a client and a server communicating across an open source, global communications network such as the Internet.

2. Description of the Related Art

Many commercial and consumer networking applications require secure communications over a network. In particular, on the Internet, electronic commerce must be performed in a secure communications environment. Currently, the default standard for secure communications between a Web client and a Web server is the Secure Sockets Layer protocol or SSL, developed by Netscape Communications Corporation, Mountain View, Calif.

Virtually all online purchases and browser-based monetary transactions that occur on the Internet are secured by SSL. However, SSL is not just limited to securing e-commerce. Financial institutions implement SSL to secure the transmission of PIN numbers and other confidential account information. Insurance companies implement SSL to secure transmission of confidential policy information. Organizations who have established Business-to-Business (B2B) extranets implement SSL to secure transactions between the company and its partners, suppliers, and customers. Private organizations implement SSL in their intranets to confidentially transfer information to and from employees.

The process of SSL encryption and decryption is computationally intensive on the server and the client communicating via SSL. For the client, typically performing only one SSL communication session, this intensity is not a problem. However, for the server performing multiple sessions, SSL CPU overhead can be a significant problem. Many security-sensitive Web sites that have implemented SSL experience bottlenecks created by the managing and processing of SSL sessions. The end-result is that SSL degrades Web server performance considerably and Web transactions are slowed to a crawl.

In general, SSL is comprised of two protocols: the SSL Handshake protocol and the SSL Record protocol. An SSL transaction consists of two distinct parts: the key exchange, and the bulk data transfer. The SSL Handshake Protocol handles key exchange and the SSL Record Protocol handles the bulk data transfer. The key exchange begins with an exchange of messages called the SSL handshake. During the handshake, the server authenticates itself to the client using public-key encryption techniques. Then, the client and the server create a set of symmetric keys that they use during that session to encrypt and decrypt data and to detect if someone has tampered with the data. The SSL handshake also allows the client to authenticate itself to the server (as would be required for an on-line banking operation, for example).

Besides authenticating the server to the client, the SSL Handshake Protocol: allows the client and server to negotiate the cipher suite to be used; allows the client and the server to generate symmetric session keys; and establishes the encrypted SSL connection. Once the key exchange is complete, the client and the server use this session key to encrypt all communication between them. They perform this encryption with a symmetric key encryption algorithm, such as RC4 or DES. This is the function of the SSL Record Protocol.

Generally, the request for an SSL session comes from the client browser to the Web server. The Web server then sends the browser its digital certificate. The certificate contains information about the server, including the server's public key. Once the browser has the server's certificate, the browser verifies that certificate is valid and that a certificate authority listed in the client's list of trusted certificate authorities issued it. The browser also checks the certificates expiration date and the Web server domain name. Once a browser has determined that the server certificate is valid, the browser then generates a 48-byte master secret. This master secret is encrypted using server's public key, and is then sent to the Web server. Upon receiving the master secret from the browser, the Web server then decrypts this master secret using the server's private key. Now that both the browser and the Web server have the same master secret, they use this master secret to create keys for the encryption and MAC algorithms used in the bulk-data process of SSL. Since both participants used the same master key, they now have the same encryption and MAC key, and use the SSL encryption and authentication algorithms to create an encrypted tunnel through which data may pass securely.

An SSL session may include multiple secure connections; in addition, parties may have multiple simultaneous sessions. The session state includes the following elements: a session identifier (an arbitrary byte sequence chosen by the server to identify an active or resumable session state); a peer certificate (an X509.v3[X509] certificate of the peer); a compression method; a cipher spec (the bulk data encryption algorithm (such as null, DES, etc.) and a MAC algorithm (such as MD5 or SHA)); a master secret (a 48-byte secret shared between the client and server); an "is resumable" flag (indicating whether the session can be used to initiate new connections). The connection state includes the following elements: server and client random byte sequences that are chosen by the server and client for each connection; server write MAC secret used in MAC operations on data written by the server; client write MAC secret used in MAC operations on data written by the client; a server write key; a client write key; initialization vectors maintained for each key and initialized by the SSL handshake protocol; and sequence numbers maintained by ach party for transmitted and received messages for each connection. When a party sends or receives a change cipher spec message, the appropriate sequence number is set to zero.

When a number of Web clients are connecting to a particular Web site having a number of servers, each server will be required to handle a number of clients in the secure transaction environment. As a result, the processing overhead that is required by each server to perform to the secure sockets layer encryption and decryption is very high. If this were the only solution to providing secure communications protocols between the client and server, each transactional Web site would be required to provide an large number of servers to handle to the expected traffic.

Accordingly, a solution has been developed to provide an acceleration device as a built-in expansion card in the server or as a separate stand-alone device on the network. The accelerator provides SSL encryption and offloads the processing task of encryption and decryption for the client using SSL from the server. A general representation of this solution is shown in FIG. 1.

FIG. 1 shows a Web client 100 coupled to the Internet 50 that may be coupled via a router 75 to an SSL accelerator device 250. The SSL accelerator device 250 is coupled to a plurality of Web servers 300. Generally, a secure SSL session with encrypted traffic is first established between SSL accelerator 120 and the Web client. Communication between the SSL accelerator 250 and the Web servers 300 occurs as clear text traffic. Hence, a secure network must connect the Web servers 300 and the SSL accelerator 250.

Commercial SSL acceleration devices include Rainbow's CryptoSwiftâeCommerce accelerator and F5's BIG IP e-Commerce Controller. Typically, commercially available SSL acceleration devices operate as shown in FIG. 2A and FIG. 2B. In FIG. 2A, the SSL accelerator is coupled between the Web client 100 and the Web server 300. Communication between the SSL accelerator and the Web client occurs through a secure TCP protocol such as HTTPS. Communication between the SSL accelerator and the Web server occurs through clear HTTP/TCP protocol.

FIG. 2B illustrates how SSL functions in the Open Systems Interconnect (OSI) Reference Model and in typical accelerators. The web client transmits data to the accelerator 250 in an encrypted form to the secure port 443 of the accelerator. In the client, the application layer protocol hands unencrypted data to the session layer; SSL encrypts the data and hands it down through the layers to the network IP layer, and on to the physical layers (now shown). Normally, a server will receive the encrypted data and when the server receives the data at the other end, it passes it up through the layers to the session layer where SSL decrypts it and hands it off to the application layer (HTTP). The same happens in the typical SSL accelerator within the accelerator, where the data is handed to the application layer, processed, then returned down the stack from the HTTP layer to the IP layer for transmission to port 80 (in the clear) on the server coupled to the SSL accelerator. Once at the server, the data returns up the stack for processing in the application layer. Since the client and the SSL device have gone through the key negotiation handshake, the symmetric key used by SSL is the same at both ends.

In essence, the HTTP packet must travel through the TCP stack four times, creating a latency and CPU overhead and requiring full TCP stack support in the accelerator. This also requires a great deal of random access memory, usually around 8-10 kB per TCP session, for retransmission support. This type of architecture also has scalability and fault tolerance problems because all of the TCP and SSL state databases are concentrated on one SSL accelerator device.

The device of the present invention overcomes these limitations by providing a packet based decryption mechanism and intercepting secure packets between a Internet coupled Web server and Internet coupled Web client.

SUMMARY OF THE INVENTION

In one aspect, the invention comprises an accelerator coupled between a client computer and a server computer, both of which are coupled to the Internet. The accelerator intercepts packet based communications between the client and the server, such as TCP/IP packet communications, and encrypts or decrypts data carried in the packets to reduce the workload of servers communicating in encrypted formats with a number of concurrent clients. In one advantageous implementation, the invention is utilized in a routing device positioned to conduct communications traffic between the client and the server. The invention finds particular usefulness in accelerating the secure sockets layer (SSL) protocol utilized in Internet commerce applications.

In a further embodiment, the invention comprises a communications encryption and decryption device, coupled to a first computer and a second computer via a network. The device may include a communications bus; a network interface coupled to the communications bus; a storage memory coupled to the bus; at least one processor coupled to the communications bus; a proxy module; and a packet-level encryption and decryption module.

In a still further embodiment, the invention comprises a method for encrypting and decrypting packet data in a network traveling between a client and a server. The method comprises the steps of: intercepting a packet communicated between the client and the server on an unsecured network; decrypting data in the packet; forwarding data in the packet to the server as clear text over a secure network; intercepting a packet communicated between the server and a client on a secure network; encrypting the data in the packet; and forwarding the encrypted data in the packet to the client over an unsecured network.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which:

FIG. 1 is a block diagram illustrating the arrow usage of a SSL accelerator in accordance with the prior art.

FIG. 2A is a block diagram illustrating the protocol connections scheme between a client, SSL accelerator, and Web server.

FIG. 2B is a block diagram illustrating the computational exercise of SSL accelerator accordance with the prior art.

FIG. 5 is a block diagram illustrating the sequence of communications in a first embodiment of the present invention between a client, an SSL accelerator device implementing a direct mode in accordance with the present invention, and a Web server.

FIG. 6 is a block diagram illustrating the sequence of communications and a second embodiment of the present invention between a client, an SSL accelerator device implementing a load balancing mode in accordance with the present invention, and a Web server.

FIG. 7 is a block diagram illustrating the sequence of communications and a second embodiment of the present invention between a client, an SSL accelerator device implementing a full TCP/IP and SSL proxy mode in accordance with the present invention, and a Web server.

FIG. 8 is a block diagram illustrating SSL multisegmentation.

DETAILED DESCRIPTION

The present invention provides a unique system and method for implementing SSL acceleration, and indeed any encryption or decryption methodology, to offload to the computational overhead required with the methodology from a server or client. The invention is particularly suited to offloading encryption and decryption tasks from a server which is normally required to handle a multitude of concurrent sessions. The system may include an SSL acceleration device, which operates to intercept secure communications between, for example, a Web based Internet client such as a Web browser operating on a personal computer, and a Web server. The SSL acceleration device will intercept communications directed to the server and act as a proxy in various embodiments of the invention. In a first embodiment, the SSL acceleration device acts as a complete proxy, substituting itself for the server and both the TCP/IP handshaking sequence and the SSL encryption and decryption sequence. In a second embodiment, the SSL acceleration device passes through the TCP/IP handshaking sequence and performs only SSL proxy encryption and decryption. In yet another embodiment, a layer-7 switching interface is utilized between the server and the client in the accelerator device. In additional embodiments, both a full TCP/IP proxy mode and a pass through mode are used interchangeably.

Figure 3:
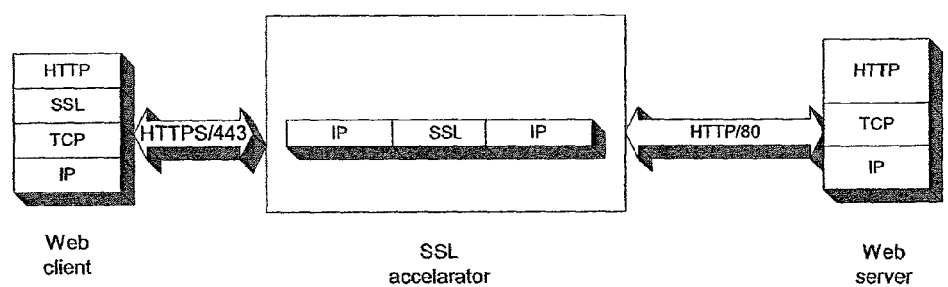
FIG. 3 is a block diagram illustrating the computational exercise of an SSL accelerator prepared in accordance with the present invention.

FIG. 3 shows how the system of the present invention differs in general from that of the prior art, and illustrates the manner in which the SSL encryption and decryption proxy is implemented. Typically, when a Web client wishes to send data via a secure protocol to an SSL enabled Web server, it will do so by communicating via a secure port 443. As shown in FIG. 3, in accordance with the present invention, the SSL accelerator will intercept data destined for port 443 of the web server and, rather than the transmitting packets up and down the TCP/IP stack as shown in FIG. 2B, will perform the SSL encryption and decryption at the packet level before forwarding the packet on to its destination. The accelerator will thus decode the packet data and forward a clear text (HTTP) packet the HTTP port 80 of the Web server 300. A number of operational modes of encryption and decryption, including a direct or pass-though mode, a load balancing mode, and a full proxy mode, are supported and the manner in which the system of the invention performs these tasks is hereinafter described.

It should be recognized that the system of the present invention may include a hardware device which may comprise a server add-in card, a network coupled device specifically constructed to perform the functions described herein, or a network coupled device having the capability of providing a plurality of functions, such as, for example, routing functions on network communications. In one embodiment, a dedicated device coupled to a network and suitable for performing the operations described herein will include network interface hardware, random access memory and a microprocessor. In an alternative embodiment, a hardware device may include a plurality of processors each with a dedicated memory or sharing a common memory, with one or more of the processors dedicated to one or more specific tasks, such as performing the SSL encryption and decryption needed to implement the present invention. One such device which is optimal for performing the method of the present invention is described in co-pending patent application Ser. No. 09/900, 481 [NEXSI-01020USO entitled MULTI-PROCESSOR SYSTEM, inventors Gruner, et al., filed Jul. 6, 2001. It will be recognized that any number of hardware configurations are available to implement the system and method of the present invention.

Figure 4:
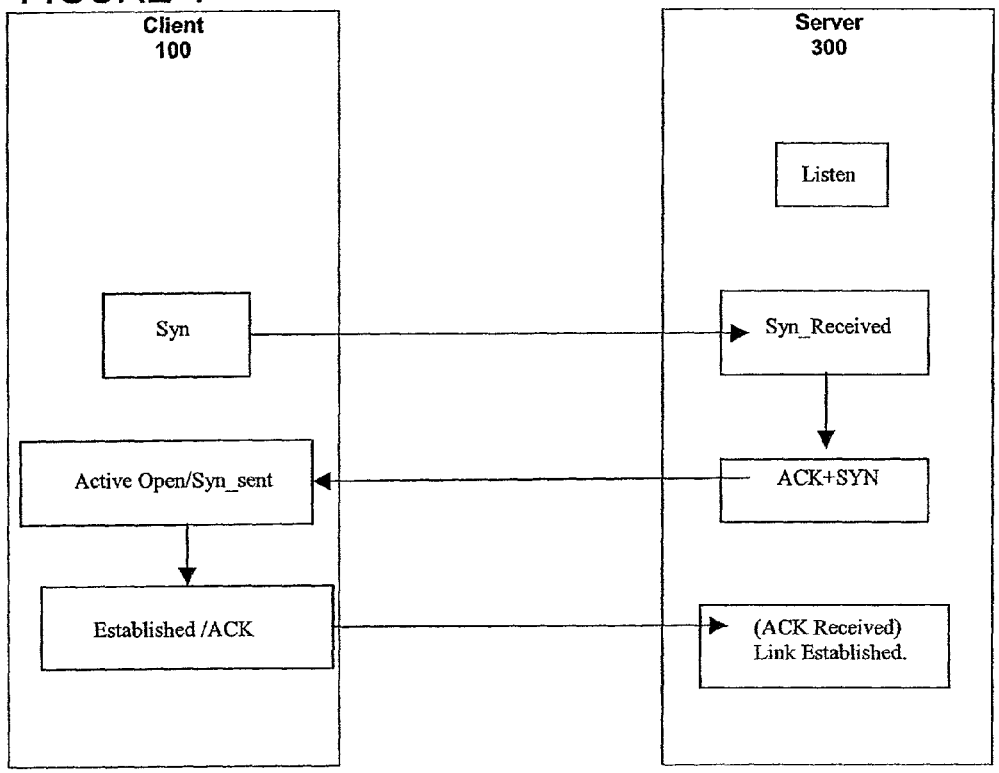
FIG. 4 is block diagram illustrating the initial TCP/IP connection between a client and a server.

FIG. 4 illustrates the typical TCI/IP handshake sequence. The "threeway handshake" is the procedure used to establish a TCP/IP connection. This procedure normally is initiated by one TCP device (in FIG. 3, the client) and responded to by another TCP device (in FIG. 3, the server). The procedure also works if two TCP simultaneously initiate the procedure.

The simplest TCP/IP three-way handshake begins by the client sending a SYN segment indicating that it will use sequence numbers starting with some sequence number, for example sequence number 100. Subsequently, the server sends a SYN and an ACK, which acknowledges the SYN it received from the client. Note that the acknowledgment field indicates the server is now expecting to hear sequence 101, acknowledging the SYN which occupied sequence 100. The client responds with an empty segment containing an ACK for the server's SYN; the client may now send some data.

In the various embodiments of the present invention, the SSL accelerator system intercepts all communication intended for the server from the client and vice versa, in order to implement SSL when required.

The general system and method of the present invention will be described with respect to FIGS. 5-7. Various modes of the invention are illustrated. It should be understood that the methods illustrated in FIGS. 5-7 are performed using instructions sets to direct performance of the aforementioned hardware, and that one objective of implementing the system is to minimize hardware requirements.

FIG. 5 illustrates a direct, cut through processing method. Packets from client to server are addressed from the client to the server and from server to client, with the intermediary, SSL device being transparent to both. In the embodiment shown therein, the SSL accelerator allows the client and server to negotiate the TCP/IP session directly, making only minor changes to the TCP/IP headers passing through the accelerator device, and tracking session data in a data structure in memory to enable SSL session handling to occur. As described herein, this mode is referred to herein as the "direct, cut-through" mode, since the client and server "think" they are communicating directly with each other, and the SSL accelerator is essentially transparent.

FIG. 6 illustrates a cut though, load balancing approach where the SSL device acts as a proxy for one or more servers, and the client recognizes the device as the server (i.e. packets from the client are addressed to the device, and the device handles passing of communications to the server via a secure network in an unencrypted format.) In this embodiment, TCP packets are re-addressed to the appropriate client or server by altering the address of the packet before forwarding. The SSL device acts as an SSL proxy for the server and may implement a load balancing function, appearing to all clients as a single server, while in reality directing traffic to a multitude of servers as illustrated in FIG. 1.

FIG. 7 illustrates a full proxy mode, wherein the SSL device acts as a proxy for one or more servers, and handles both the SSL and TCP communications for the server.

While FIGS. 5-7 illustrate a single process of communication, it will be understood that multiple sessions similar to those illustrated in FIGS. 5-7 may be occurring on a single SSL accelerator device. Moreover, it should be understood that various embodiments may likewise occur on a single device.

In the embodiment shown in FIG. 5, SSL accelerator device 250 intercepts communications between the client 100 and server 300. Device 250 passes on the TCP/IP negotiation communications between the client 100 and the server 300.

FIG. 5 illustrates a client device 100, having an IP address of 1.1.1.1, attempting to establish an SSL session with server 300, having an IP address of 3.3.3.3. The SSL accelerator device (SSLAD) 250 having an exemplary IP address of 2.2.2.2 will intercept traffic between client 100 and server 300 according to routing tables present on the Internet in accordance with well-known techniques.

Initially, the client 100 sends a SYN packet to TCP port 443 of server 300 (at step 202). The SYN packet will define, for example, an MSS of some length, for example, 1460 bytes. (As should be generally understood, the MSS is the maximum segment size and is a configurable TCP parameter allowing an understanding between the communicating devices of the maximum number of bytes of data allowed in a data packet; the default is 576 bytes.) The SSL Accelerator device 250 will intercept (at step 204) the SYN packet transmitted by client 100 (at step 202). The SSL Accelerator may also perform other functions on packet to enable the SSL acceleration device to continue to perform its SSL proxy functions. For example, the SSL accelerator may reduce the initially defined MSS value in the communication sequence between the client and server in order to accommodate headers and extensions utilized in the system of the present invention in the packet. MSS reduction takes place by, responding to the initial SYN packet from the client 100 with a setting in the options field of the TCP/IP header. For example, in the method of the present invention, if Server 300 uses the same MSS value as the client communicating with the SSL accelerator, the server will output data equal to the MSS value in each packet, but the SSL accelerator will require space for SSL overhead in returning an encrypted packet to the client. Hence, the SSL may reduce the SSL-Server MSS value to leave room for header information back to the server. An exemplary value would be for the MSS to equal the Client's MSS less the SSL Overhead, but other modifications or schemes may be used in accordance with the present invention.

Next, the SSL accelerator will forward the client's initial SYN packet on to the server 300 at step 206 as clear text on port 80. Server 300 will respond to the TCP SYN packet at step 208 with its own SYN and ACK packet addressed to the client 100. The SSL accelerator device will then respond from port 443 with SYN packet at step 210, and acknowledgement packet ACK which verifies the MSS. The client will then respond with an ACK on port 443 (at step 212) that is forwarded on to server 300 at step 214 and the TCP session is now established.

Client 100 will then begin an SSL session at 220 by starting the SSL handshake with the SSL accelerator device. In accordance with the invention shown in FIG. 5, the SSL accelerator device 250 responds to the client with all appropriate handshake responses 230, 235.

As is well known in the art, it is typically the responsibility of the SSL handshake protocol to coordinate the states of the client and server, thereby allowing the protocol state machines of each to operate consistently, despite the fact that the state may not be exactly parallel. Logically the state is represented twice, once as the current operating state, and (during the handshake protocol) again as the pending state. Additionally, separate read and write states are maintained. When the client or server receives a change cipher spec message, it copies the pending read state into the current read state. When the client or server sends a change cipher spec message, it copies the pending write state into the current write state. When the handshake negotiation is complete, the client and server exchange change cipher spec messages), and then communicate using the newly agreed-upon cipher spec.

In the system of the present invention, the SSL device takes over the role typically occupied by the server in the handshake protocol.

The SSL handshake occurring at step 235, 230 may occur as follows. The client 200 sends a client hello message to which the SSL accelerator 250 must respond with a server hello message, or a fatal error will occur and the connection will fail. The client hello and server hello are used to establish security enhancement capabilities between client and server. The client hello and server hello establish the following attributes: protocol version, session ID, cipher suite, and compression method. Additionally, two random values are generated and exchanged: ClientHello.random and ServerHello.random.

Following the hello messages, the SSL Accelerator 250 will send the certificate of server 300, if it is to be authenticated. Additionally, a server key exchange message may be sent, if it is required (e.g. if their server has no certificate, or if its certificate is for signing only). If the server is authenticated, it may request a certificate from the client, if that is appropriate to the cipher suite selected.

Next the SSL accelerator will send the server hello done message, indicating that the hello-message phase of the handshake is complete. The server will then wait for a client response.

If the SSL accelerator has sent a certificate request message, the client must send either the certificate message or a no certificate alert. The client key exchange message is now sent, and the content of that message will depend on the public key algorithm selected between the client hello and the server hello. If the client has sent a certificate with signing ability, a digitally signed certificate verify message is sent to explicitly verify the certificate.

At this point, the client sends a change cipher spec message, and the client copies the pending Cipher Spec into the current Cipher Spec. The client then immediately sends the finished message under the new algorithms, keys, and secrets. In response, the SSL accelerator will send its own change cipher spec message, transfer the pending to the current Cipher Spec, and send its Finished message under the new Cipher Spec. At this point, the handshake is complete and the client and SSL accelerator may begin to exchange application layer data.

During the handshaking sequence, the SSL accelerator will update the TCP/SSL database and associate the SSL sequence numbers with the TCP sequence numbers for the session. Hence, each session will include a plurality of TCP-SSL sequence number pairs, with the number of pairs per session being variable based on a set number or time. These pairs can then be used for rollback recovery in the event that TCP or SSL packets are lost. The database storing these pairs is typically stored in the memory of the apparatus.

As shown at reference number 265, client 100 will now begin sending encrypted application data to the SSL accelerator device 250. The client will send a request on port 443. In the client's request, the source IP will be mapped to the client's IP, the destination IP will be mapped to the virtual IP of the SSL accelerator device, the source port will be mapped to the client's port and the destination port will be 443. This request will include the sequence number and acknowledgement (SEQ/ACK).

The accelerator device will process the data at step 270 on the packet level and forward it to the server as clear text. When encrypted application data is received by SSL acceleration device 250 at step 270, the data in the packet is decrypted and the SSL record extracted, and the TCP/SSL database record is updated by storing the TCP sequential number, the SSL sequential pair, the initialization vector and expected ACK.

The SSL accelerator 250 includes a TCP/SSL session database to track all communication sessions occurring through it. Each session will have one or more records associated with it, with each record comprising an association of the TCP session sequence and the SSL sequence. Hence, on receiving the initial SYN from client 100 at step 202, the SSL accelerator will create a database entry for the particular session, associating the TCP-SSL sequence number pairs. The data may be considered as a table, with each row in the table representing one entry in a given session. Hence, for each session, a typical record might include up to about 8-16 records, which include a TCP sequence number, SSL session number, an initialization vector (for DES and 3DES) and an expected ACK.

During decryption, the device may utilize portions of its memory to buffer segments as necessary for decryption. The number and size of the buffers will depend on the cipher scheme used and the configuration of the packets, as well as whether the packets contain application data spanning multiple packets, referred to herein as multi-segment packets (and illustrated with respect to FIG. 8). The SSL device can allocate SSL buffers as necessary for TCP segments. If, for example, application data having a length of 3000 bytes is transmitted via TCP segments having a length of 100 bytes, the device can, copy TCP segment 1 to a first SSL buffer, and start a timer, wait for packet 2 and when received, copy it to an SSL buffer and restart the timer, and finally when packet 3 is received, the SSL accelerator will copy it, decrypt all application data, authenticate it and forward the data on in the clear. (An alternative, bufferless approach is described below).

Decrypted packets are then forwarded in clear text to server 300 at port 80. The SSL accelerator device will forward the data decrypted to port 80 of server with the client IP mapped to the source IP, the virtual IP as the destination IP, the client port as the source port, and port 80 as the destination port. The SSL accelerator device will also send a SEQ/ACK to the server 300.

The server 300 receives packet at step 275 and processes the packet as required, and returns the packet in the clear to SSL accelerator device 250. The server will respond with a SEQ1/ACK1 acknowledging the data and if necessary, sending data of its own with the destination IP as the client IP, the source IP as the virtual IP, the destination Port as the clients port, and a source port of 80.

Upon receiving the clear packet at step 280, the accelerator device will extract the ACK, look to the database to compare the ACK with all expected server ACKs less than or equal to the received ACK, and save the TCP sequential number and SSL sequential pair. The SSL accelerator device will then encrypt the data for sPort 443, assigning the virtual IP of the SSL accelerator as the source IP, the client IP as the destination IP, the destination port as the client port, the source port as port 443, along with the appropriate SEQ/ACK, and return the information to client's HTTP 443 port at step 372.

Client 100 will then receive and decrypt the packet at 282, and send and ACK back to the server at 284. This ACK is received by the SSL accelerator device at step 285, compare with all expected client ACKS, clear all entries which have expected ACKs less than or equal to this received ACK, and forward the ACK on to server 300.

This process continues as long as the client and server require. Upon completion of the transmission, the SSL accelerator will send a closed notify alert to the client, and the client will respond to close notify alert.

FIG. 6 shows an alternative method of the present invention wherein the SSL device may be utilized for load balancing amongst a number of servers. In the embodiment of FIG. 5, the packet destination addresses and source addresses were not modified. In the embodiment of FIG. 6, the SSL accelerator assumes the identity of the server, and handles and distributes sessions to a multitude of servers by altering the source and destination addresses of packets in a manner similar to that utilized in Network Address Translation (NAT). While this example is illustrated with respect to a single session, it should be understood that a multitude of similar TCP/SSL sessions may be simultaneously occurring with a multitude of servers. Routing tables associated with the SSL sessions may be utilized by the SSL accelerator device to track the routing of the sessions to individual servers in accordance with well-known techniques.

In a manner similar to the embodiment shown in FIG. 5, the client 100 sends a handshaking packet SYN packet to TCP port 443 of SSL accelerator 250 rather than directly to server 300 (at step 202*a*) The SSL Accelerator device 250 will receive (at step 204*a*) the SYN packet transmitted by client 100 and may perform functions on packet to enable the SSL acceleration device to continue to perform its SSL proxy functions.

The SSL accelerator will forward the client's initial SYN packet on to the server 300 at step 206 as clear text on port 80. The SSL accelerator SYN packet to server will identify the source IP as the SSLAD 250 IP, the source port as the client's port, the destination IP as the virtual IP assigned by the SSL accelerator device, and the destination port as port 80. Server 300 will respond to the TCP SYN packet at step 208*a* with its own SYN and ACK packet addressed to the client 100. Upon receipt of the SYN/ACK packet from server 300, the SSL acceleration device will change the state of the SSL-TCP database by examining the database for expected ACKS from the server, and once found, will clear the entry for the expected ACK and any previous ACKS in the table. The SSL accelerator device will then respond from port 443 to the client with SYN packet at step 210*a* and the client will then respond with an ACK on port 443 (at step 212) that is forwarded on to server 300 at 214*a* and the TCP session is now established.

It should be noted that the SSL device may implement a load balancing selection algorithm in accordance with any of a number of techniques to select one or more servers 300, 301, 302, etc. to provide an even resource load amongst any number of servers communicating with the intermediary device.

The client 100 will then begin an SSL session at 220*a* by starting the SSL handshake with the SSL accelerator device 250. In the embodiment shown in FIG. 6, the SSL accelerator device 250 responds to the client with all appropriate handshake responses 230, 235 and uses its own IP as the source.

A typical handshake occurring at step 235, 230 may occur as set forth above with respect to FIG. 5, except that the client is communicating directly with the SSL accelerator device (e.g. the destination IP from the client is that of the SSL accelerator).

As shown at reference number 265*a*, client 100 will now begin sending encrypted application data to the SSL accelerator device 250.

When encrypted application data is received by SSL acceleration device 250 at step 270, the data in the packet is decrypted and the SSL record extracted, and the TCP/SSL database record is updated by storing the TCP sequential number, the SSL sequential pair, the initialization vector and expected ACK. The packet is then forwarded in clear text to server 300 at port 80. The SSL accelerator device will forward the data decrypted to port 80 of server utilizing the client IP as the source IP, the SSL virtual IP as the destination IP, the client port as the source port, and port 80 as the destination port.

The server 300 receives packet at step 275, processes the packet as required, and returns the packet in clear to SSL accelerator device 250. Upon receiving the packet at step 280, the accelerator device will extract the ACK, compare the ACK with all expected server ACKs less than or equal to the received ACK, save the TCP sequential number and SSL sequential pair, encrypt the packet and forward the encrypted packet to client 100. The SSL accelerator device will then encrypt the data for sPort 443, assigning as the source IP as the virtual IP, the destination IP as the client IP, the destination port as the client port, the source port as port 443, along with the appropriate SEQ/ACK, and return the information to client's HTTP port 443. Upon completion of the transmission, the SSL accelerator will send a closed notify alert and the client will respond to close notify alert.

Client 100 will then receive and decrypt the packet at 282, and send and ACK back to the server at 284. This ACK is received by the SSL accelerator device, compared with all expected client ACKS, clear all entries which have expected ACKs less than or equal to this received ACK, and update the sequential number pair. This ACK is then forwarded on to server 300.

FIG. 7 shows yet another embodiment of the present invention wherein the SSL accelerator performs a full proxy for both the TCP/IP negotiation process as well as the SSL encryption process. As shown in FIG. 7, a SYN packet destined for server will be received and responded to by the SSL acceleration device 250. The SSL acceleration device, at step 207, performs all functions performed by the server and set forth in steps 206, 208 and 216 in FIGS. 5 and 6. Later, at step 236, the SSL acceleration device 250 will negotiate its own TCP/IP session with server 300 to forward decrypted information to the server 300 in the clear.

Client 100 sends a SYN packet TCP port 443 of server 300. The SYN packet will define, for example, an MSS of 1460 bytes. The SSL accelerator device will respond from port 443 with SYN packet V, and acknowledgement packet ACK which verify MSS=1460. The Client will then respond with an ACK on port 443.

On receipt of the ACK packet at step 210, the TCP session is established and the TCP state is set to "established". The client 100 will then begin an SSL session at 220*b* by starting the SSL handshake with the SSL accelerator device 250. In the embodiment shown in FIG. 7, the SSL accelerator device 250 responds to the client with all appropriate handshake responses 230, 235 and uses its own IP as the source.

A typical handshake occurring at step 235, 230 may occur as set forth above with respect to FIG. 7, except that the client is communicating directly with the SSL accelerator device. It should be understood that the SSL Encryption in this embodiment is essentially the same as the embodiment of FIG. 6.

Concurrently, at step 236, the SSL accelerator device will negotiate with server 300, to establish a clear text session with server 300. This is accomplished by the SSL accelerator device sending a TCP/80 SYN packet to server identifying the source IP (sIP) as the client 200 IP (cIP), the source port (sPort) as the client's port (cPort), the destination IP (dIP) as the virtual IP (vIP) assigned by the SSL accelerator device, and the destination port (dPort) as port 80

The server responds (238) with a SYN packet and ACK packet, which will draw ACK from the SSL accelerator 250.

The SSL accelerator 250 is now positioned to receive SSL encrypted data from the client 100 and forward it as clear text to server 300.

Once the SSL and TCP sessions are established, the client can send SSL encrypted data to the accelerator 250. The SSL session is terminated on the accelerator 250 and decrypted SSL data is copied to the server's TCP session at step 270*c*. Likewise, after clear data is forwarded to the server and responded to (at step 275), clear data is received by the SSL accelerator at step 280, copied to the client's SSL session and returned in encrypted form to the client at step 280. The server's TCP session within the SSL device 250 is terminated on SSL device 250. An ACK is sent when SSL data returned to client 100 is received.

In yet another alternative embodiment of the invention, a further enhancement implemented in the SSL acceleration device is that of a web switching or layer 7 protocol interface. Devices incorporating content or "layer 7" switching are well known in the art. Content or layer 7 switching may be implemented any SSL acceleration device and communicate directly with the Web server 300.

In this embodiment, the SSL accelerator device SSL layer will negotiate with the layer 7 switching implementation on the SSL device, to establish a clear TCP session on Port 80 to the server 300. The SSL accelerator device will send a TCP/80 SYN packet to the layer 7 switching which identifies the source IP as the client 200 IP, the source port as the client's port, the destination IP as the virtual IP assigned by the SSL accelerator device, and the destination port as port 80

The switching layer responds with a SYN packet and ACK packet which will draw the acknowledgement ACK from the SSL accelerator device. The SSL accelerator device 250 is now positioned to receive SSL encrypted data from the client 100 and forward it as clear text to server 300. SSL accelerator device will then send the finished code to the client 100 to indicate that the SSL protocol is ready.

The SSL accelerator device will decrypt the encrypted data at the packet level by extracting data from the TCP packet sent by client 100. and will forward the data decrypted to port 80 of the switching layer utilizing the client IP as the source IP, the SSL virtual IP as the destination IP, the client port as the source port, and port 80 as the destination port. The SSL accelerator device will also send SEQ/ACK to the Web switching layer. The switching layer will forward, the decrypted data to TCP port 80 identifying the client IP as the source IP port, the switching port as the source port, the destination IP as real server 300 IP address, and the destination port as port 80.

The switching layer will then translate the destination IP address to be source IP address, source IP address to the client IP address, the destination IP address to the real server IP address, and the source port to the real switching port. The destination port will be 80 and the HTTP/80 request will be forwarded to server 300. The server will respond the HTTP 80 response indicating that the destination IP is the client IP, the source IP is the real server IP address, the destination port is the Web switching port, the source port is port 80 and the appropriate SEQ/ACK.

Switching layer will forward the HTTP 80 response to the SSL accelerator device substituting for IP the virtual IP assigned to the server 300 by the SSL accelerator device, substituting for the data for the client port, and the source port equals 80 with the appropriate SEQ/ACK.

Once received by SSL accelerator device, the SSL accelerator device will encrypt the a data for port 443, assign the source IP as the virtual IP, the destination IP as the client 100 IP, the destination port as the client port, the source port as port 443, along with the appropriate SEQ/ACK and return the information to client's HTTP 443 port. Upon completion of the transmission, the SSL accelerator will send a closed notify alert and the client will respond to close notify alert.

Figure 9A:
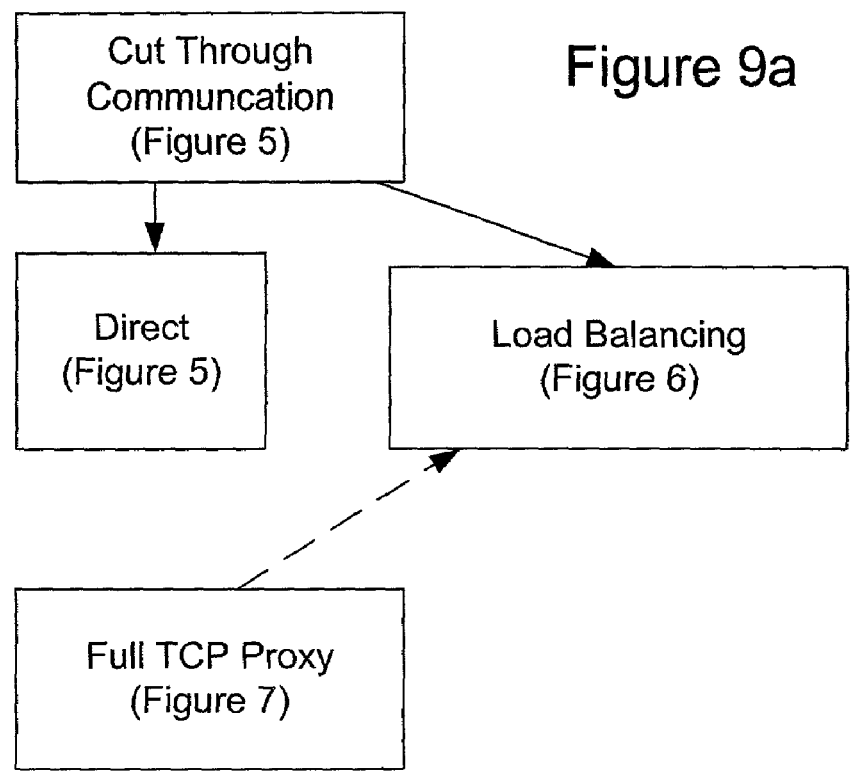
FIGS. 9a and 9b are block diagrams illustrating the various modes of implementing the invention.
Figure 9B:
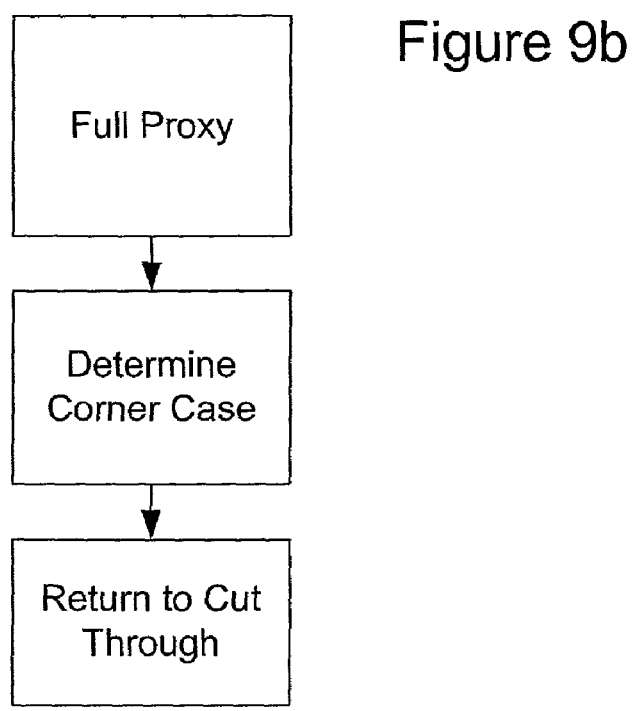

It should be further recognized that the system of the present invention can implement hybrid of the foregoing schemes. FIG. 9a shows an overview of the various modes which may be implemented by the SSL device. As shown therein, using cut-through communication, both a direct mode (one to one communication between client and server) and a load balancing (address redirection) schemes may be utilized. In a full proxy mode, the SSL device performs both TCP and SSL functions, with this mode being optionally utilized for load balancing. FIG. 9b shows a further feature of the device, allowing for mode switching: the system can begin a full TCP proxy mode session (in accordance with the description of FIG. 6) and switch to cut through/direct modes depending on the circumstances of the data transfer. Full proxy TCP mode has the advantage that all cases of transmission are supported. However, this embodiment requires more buffer memory than TCP cut through mode shown in FIG. 5.

In the cut through modes, certain types of packet transmissions can cause problems. For example, when the SSL record transverses more than one TCP segment or when the client window is very small, (for example, on the order of 200-300 bytes) and many small TCP segments are received.

The switching mode shown in FIG. 9b can therefore allow the TCP proxy mode for SSL and TCP session setup, and then cut through mode for normal data, with a roll back to the proxy TCP mode for problem cases.

There are numerous types of communications problems which may occur at various stages of data transfer between the SSL Accelerator, the client and the server. Some examples of these problems, and how the SSL device handles them, are set forth below. However, it will be understood that the number and type of errors which are possible in this sequence, and their attendant solutions, are too numerous to detail here.

One type of problem is lost packets. Most lost packet cases can be recovered through use of the data structure mentioned above. As the data structure maintains the TCP sequence number, SSL sequence number, expected ACK and DES's Initialization vector, the SSL Accelerator device can roll back the SSL number to the previous TCP number received.

A different problem occurs not packets are lost, but when there is an SSL segmentation problem. Segmentation problems may occur when, for example, 1 SSL record spans over 3 TCP segments, i.e.: where SSL length=3000, and the TCP packet's length=1000. This segmentation issue is illustrated in FIG. 8. In this case, the Accelerator device cannot decrypt and authenticate the packet, since the MAC algorithm data will not arrive for another two segments.

If, in the method of the invention, the accelerator uses a memory buffer, (as described above with respect to FIG. 5) the Accelerator can allocate an SSL buffer for 3000 bytes, copy TCP segment 1 to the SSL buffer, and start a timer. When packet SSL/TCP packet 2 is received, it will be copied to an SSL buffer and the timer restarted. Then when packet 3 is received, the SSL accelerator will copy it, decrypt it, allocate 3 TCP, segments, and copy HTTP data into it. This may then be forwarded on in the clear.

An alternative embodiment of the present invention utilizes a bufferless or small buffer approach to handle the multisegment problem. In the bufferless approach, individual segments of multisegment SSL records are decrypted, but not authenticated prior to being sent to the server. Upon receipt of the last segment in the series (packet 3 in the above example), the data will be authenticated, however, individual segments are not. This greatly reduces the hardware requirements of the device be requiring little or no buffer memory allocated to multi segment SSL packets. For non-block ciphers, such as RC2 and RC4, this decryption can be performed on the fly. However, for block ciphers such as 3DES/DES, some buffering must occur. This is due to the fact that data for these ciphers must be combined from blocks. In these cases, only part of the data is decrypted and the rest is moved to the next segment. Hence, if there are more than two segments, and the encryption cipher is DES, with 8 byte blocks, the SSL device will buffer up to 7 bytes with additional 7 bytes sequentially moved until the last segment, with the last segment always having enough room to accommodate the data without breaking the server's MSS. In an exemplary design, the operational modes are configurable by a user so that the sacrifice of whether to potentially compromise security by not authenticating each packet is the user's choice. Nevertheless, because for block ciphers it is impossible to know the padding length before decryption is finished and the padding length is used to start calculating authentication, then authentication of the data in the multi-segment SSL data does occur upon receipt of the last segment—and the receipt of the MAC algorithm data and one is required to store all decrypted data into a buffer. If, however, the data cannot be authenticated at that time, the SSL device will send a reset to the server and an ALERT to the client, indicating a problem with the session has occurred and notifying the user. For block ciphers, the system does some buffering, but this minimal buffering will reduce latency.

Another issue may occur when a "small" window problem occurs. Normally, communications between the Sever to Client occur as shown in Table 1:

TABLE 1

| Client | SSL Accelerator | Server |
| --- | --- | --- |
|  |  | ← TCP80 1 = 0 |
|  | encrypt |  |
|  | ← SSL TCP443 |  |
|  | 1 = 0 |  |
|  |  | ← TCP80 2 = 1000 |
|  | Encrypt |  |
|  | ← SSL TCP443 |  |
|  | 2 = 1000 |  |
|  |  | ← TCP80 3 = 2000 |
|  | Encrypt |  |
|  | ← SSL TCP443 |  |
|  | 3 = 2000 |  |
| TCP443 ACK = 3000 → |  |  |
|  | TCP80 ACK3000 → |  |

The small window problem may occur when, for example, the ServerMSS=1000, but Client understands an MSS=900. In this situation, if the client sends an ACK W=3000, the SSL accelerator will understand it is going to receive 3, 1000 byte segments. This problem is illustrated in Table 3. In Table 3, the server's packet length is, for example, 100 bytes. So instead of receiving 3, 1000 byte segments, the SSL accelerator will receive 30, 100 byte segments from the server. Once the SSL accelerator adds the SSL overhead, which in this example is 100 bytes, the packet size to be returned to the client doubles for each packet from the server:

TABLE 2

| Client | SSL Accelerator | Server |
| --- | --- | --- |
| Ack W = 3000 --> |  |  |
|  | Ack W = 2700 |  |
|  | (SSL expecting 3 |  |

TABLE 2-continued

| Client | SSL Accelerator | Server |
|---|---|---|
| | 1000 Segments) | |
| | | <-- TCP 1 = 0, I = 100 |
| | Encrypt <-- SSL TCP 1 = 0, I = 200 | |
| | | <-- TCP 2 = 100, I = 100 |
| | Encrypt <-- SSL TCP 2 = 200, I = 200 | |
| | | <-- TCP 3 = 200, I = 100 |
| | Encrypt <-- SSL TCP 3 = 400, 1 = 200 * * * | |
| | | <-- TCP 14 = 1400, I = 100 |
| | Encrypt <-- SSL TCP 4 = 2800, I = 200 | |
| | | <-- TCP 15 = 1500, I = 100 |
| | Encrypt <-- SSL TCP 5 = 3000, I = 200 | |
| | | <-- TCP 16 = 1600, I = 100 |

The SSL accelerator cannot send TCP packet 16 because client's window is full already (with 15, 200 byte packets).

In this case, the SSL accelerator will buffer the Server's responses, starting from this point so that when a next TCP ACK=3000 is received from the client, the SSL accelerator will take the server response (packet 16) from the buffer, encrypt it and return it to the client.

If one of the foregoing problems occurs when the SSL accelerator is in a mode which does not support that particular type of communication, the SSL accelerator may switch modes to enable that type of communication to be handled.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for secure communications between a client and a server, comprising:
    managing a communications negotiation between the client and the server through an intermediate device that supports a direct mode and a proxy mode;
    receiving encrypted data packets from the client with the intermediate device;
    decrypting each encrypted data packet with the intermediate device;
    forwarding unencrypted data packets from the intermediate device to the server using a communication session negotiated by the client and the server when the intermediate device operates in direct mode;
    forwarding unencrypted data packets from the intermediate device to the server using a communication session negotiated by the server and the intermediate device when the intermediate device operates in proxy mode;
    receiving data packets from the server;
    encrypting the data packets from the server; and
    forwarding encrypted data packets to the client.

2. The method of claim 1 wherein said step of managing comprises:
    receiving TCP session negotiation data from the client and modifying the negotiation data prior to forwarding the negotiation data to the server to establish the communications session between the client and the server when operating in direct mode.

3. The method of claim 2 wherein the method includes the further step of modifying a SYN request from the client to the server to alter the packet transmission parameters.

4. The method of claim 3 wherein said step of modifying includes modifying at least a maximum segment size value of said data packet.

5. The method of claim 1, wherein the method further includes the steps of negotiating an SSL session with the client.

6. The method of claim 1 wherein decrypting comprises decrypting SSL encrypted packet data, and wherein encrypting comprises encrypting a data packet with SSL.

7. The method of claim 1 wherein said step of managing comprises receiving with the intermediate device communication negotiation data directed to the server from the client and responding to said negotiation in place of the server when the intermediate device operates in proxy mode.

8. The method of claim 7 further including negotiating the communications session between the server and the intermediate device as a separate TCP session.

9. The method of claim 1 further including the step, prior to said step of receiving encrypted data, of negotiating an encrypted data communications session between the intermediate device and the client.

10. The method of claim 1 wherein said step of managing comprises maintaining a database of entries on each session of data packets communicated between the client and the server.

11. The method of claim 10 wherein said database includes an entry for a session comprising a session ID, a TCP Sequence number and an SSL session number.

12. The method of claim 10 wherein said entry further includes an initialization vector.

13. The method of claim 10 wherein said entry includes an expected ACK.

14. The method of claim 1 wherein said step of receiving encrypted data packets includes receiving data packets including encrypted application data spanning multiple packets, and said step of forwarding includes forwarding a portion of the application data contained in an individual encrypted TCP segments to the server without authentication.

15. The method of claim 14 further including the step of authenticating the application data on receipt of all packets including the application data.

16. The method of claim 14 wherein said data is not buffered during decryption.

17. The method of claim 14 wherein said data is buffered for a length sufficient to complete a block cipher used to encrypt the data.

18. The method of claim 1, further comprising automatically switching the intermediate device from the direct mode to the proxy mode upon detecting a communication error associated with the direct mode.

19. A method for secure communications between a client and one of a plurality of servers performed on an intermediary device, comprising:
  establishing a communications session between the client and said one of said plurality of servers by receiving negotiation data from the client intended for the server and forwarding the negotiation data in modified form to the server, and receiving negotiation data from the server intended for the client and forwarding the negotiation data to the client to establish the client and the server as terminations for the communications session;
  establishing a secure communications session between the client and the intermediary device;
  maintaining a database of the secure communications session including information on the session/packet associations;
  receiving encrypted application data from the client at the intermediary device by the secure communications session between the intermediary device and the client;
  decrypting the application data; and
  forwarding decrypted application data from the intermediary device to said one of said plurality of servers using the communications session established between the client and the server.

20. The method of claim 19 further including the steps of:
  receiving at the intermediary device application data from the server, destined for the client;
  encrypting the application data at the intermediary device; and
  forwarding the application data to the client along the secure communication session established between the intermediary device and the client.

21. The method of claim 20 wherein forwarding the application to the data comprises receiving packets from said one of said plurality of servers and modifying the source and destination addresses of the packet to forward the packet to the client.

22. The method of claim 19 wherein the method further includes the step of selecting one of the plurality of servers for each packet in the communications session and mapping all communications intended for the server to said one of said plurality of servers.

23. The method of claim 19, wherein said step of decrypting application data comprises decrypting data and forwarding said data on to said one of said plurality of servers via a secure network.

24. The method of claim 23 further including the step of receiving application data from said one of said plurality of servers, encrypting said data, and forwarding encrypted data to said client.

25. The method of claim 19 wherein said database includes an entry for a session comprising a session ID, a TCP Sequence number and an SSL session number.

26. The method of claim 19 wherein said entry further includes an initialization vector.

27. The method of claim 19 wherein said entry includes an expected ACK.

28. The method of claim 19 wherein said step of forwarding includes:
  forwarding data which spans over multiple TCP segments and forwarding data which is not authenticated.

29. The method of claim 28 wherein said data is not buffered during decryption.

30. The method of claim 28 wherein said data is buffered for a length sufficient to complete a block cipher used to encrypt the data.

31. The method of claim 28 wherein said step of forwarding includes authenticating the decrypted data after a final segment of a multi-segment encrypted data stream is received.

32. An acceleration apparatus coupled to a public network and a secure network, communicating with a client via the public network and communicating with one of a plurality of servers via the secure network, comprising:
  a network communications interface;
  at least one processor;
  programmable dynamic memory;
  a communications channel coupling the processor, memory and network communications interface;
  a client/server open communications session manager;
  a client secure communication session manager;
  a client/server secure communications session tracking database; and
  a data packet encryption and decryption engine,
  wherein the acceleration apparatus is adapted to operate in a direct mode and a proxy mode,
  wherein in the direct mode the acceleration apparatus decrypts data packets received from the client and forwards the decrypted data packets to one of the servers using a communication session negotiated by the client and the server,
  wherein in the proxy mode the acceleration apparatus responds to the client on behalf of the server and forwards the decrypted data packets to the server using a communication session negotiated by the acceleration device and the server.

33. The apparatus of claim 32 wherein in the proxy mode the client open communications session manager and secure communication manager enable the apparatus as a TCP and SSL proxy for the server.

34. The apparatus of claim 32 wherein in the direct mode the communications session manager enables transparent secure and open communication between the client and the server.

35. The apparatus of claim 32 further including a load selection manager balancing the routing of multiple open and secure communications session between a plurality of clients and a plurality of servers based on current processing levels of the servers.

36. The apparatus of claim 32 wherein data packet encryption and decryption engine performs SSL encryption and decryption on data packets transmitted between the client and said at least one server.

37. The apparatus of claim 32 wherein said session tracking database includes a TCP sequence number and an SSL sequence number.

38. The apparatus of claim 32 further including a recovery manager coupled to the database.

39. The apparatus of claim 38 wherein the session tracking set maintains database having at least one record per communication session between the client and server.

40. The apparatus of claim 32 wherein said data is not buffered during decryption.

41. The apparatus of claim 32 wherein said data is buffered for a length sufficient to complete a block cipher used to encrypt the data.

42. The apparatus of claim 32 wherein said client/server open communications session manager performs an authentication process that discards at least a portion of the decrypted, unauthenticated packet application data from the client prior to receiving a final segment of the application data and authenticates the decrypted data using only the remaining portion of the application data.

43. The apparatus of claim 32, wherein the acceleration apparatus automatically switches from the direct mode to the proxy mode upon detection of a communication error associated with the communication session negotiated by the client and the server.

44. A secure sockets layer processing acceleration device, comprising:

a communication engine establishing a secure communications session with a client device via an open network;

a server communication engine establishing an open communications session with a server via a secure network; and an encryption and decryption engine operable on encrypted data packets received via the open communications session and on clear data received via the open communications session, wherein the communication engine supports: (1) a direct mode in which decrypted data packets are forwarded to the servers using a communication session negotiated by the client and the server, and (2) a proxy mode in which the acceleration device responds to the client on behalf of the server and forwards the decrypted data packets to the server using the open communications session established by the acceleration device and the server.

45. The SSL acceleration device of claim 44 wherein when operating in direct mode the communication engine forwards modified communication session data to the server over the communication session between the client device and the server.

46. The SSL acceleration device of claim 44 wherein when operating in proxy mode the communication engine acts as a proxy for a plurality of servers in communication with the SSL acceleration device.

47. The SSL acceleration device of claim 44 further including a session tracking database interacting with the encryption and decryption engine tracking client and server communications.

48. The SSL acceleration device of claim 44 wherein the encryption and decryption engine includes a bufferless mode transmitting decrypted, unauthenticated data to a server.

49. The SSL acceleration device of claim 44 further including a load balancing engine that selects the server from a plurality of servers based on a load balancing algorithm that calculates current processing loads associated with each of the servers.

50. The SSL acceleration device of claim 44, wherein the communications engine automatically switches from the direct mode to the proxy mode upon detection of a communication error with the communication session negotiated by the client and the server.

\* \* \* \* \*